United States Patent
Kobayashi

(10) Patent No.: US 12,539,419 B2
(45) Date of Patent: Feb. 3, 2026

(54) LIVING BODY STIMULATION DEVICE

(71) Applicant: TECHNO LINK CO., LTD., Niigata (JP)

(72) Inventor: Tatsuyuki Kobayashi, Niigata (JP)

(73) Assignee: TECHNO LINK CO., LTD., Niigata (JP)

( * ) Notice: Subject to any disclaimer, the term of this patent is extended or adjusted under 35 U.S.C. 154(b) by 341 days.

(21) Appl. No.: 18/250,802

(22) PCT Filed: Mar. 30, 2023

(86) PCT No.: PCT/JP2023/013288
§ 371 (c)(1),
(2) Date: Apr. 27, 2023

(87) PCT Pub. No.: WO2024/075324
PCT Pub. Date: Apr. 11, 2024

(65) Prior Publication Data
US 2024/0325752 A1    Oct. 3, 2024

(30) Foreign Application Priority Data
Oct. 5, 2022    (JP) ................................ 2022-160826

(51) Int. Cl.
*A61N 1/36*    (2006.01)

(52) U.S. Cl.
CPC ................... *A61N 1/36034* (2017.08)

(58) Field of Classification Search
None
See application file for complete search history.

(56) References Cited

U.S. PATENT DOCUMENTS 6,526,319 B2    2/2003    Kobayashi
11,191,957 B2   12/2021    Kobayashi
(Continued)

FOREIGN PATENT DOCUMENTS

| | | |
|---|---|---|
| EP | 1749608 A1 | 2/2007 |
| EP | 3616746 A1 | 3/2020 |
| JP | 2003018835 A | 1/2003 |

(Continued)

OTHER PUBLICATIONS

Extended European Search Report issued in corresponding European Application No. 23716756.4 mailed Jun. 19, 2024 (7 pages).

*Primary Examiner* — Carl H Layno
*Assistant Examiner* — Bryan Mcallister Lee
(74) *Attorney, Agent, or Firm* — Osha Bergman Watanabe & Burton LLP

(57) ABSTRACT

A living body stimulation device includes a transformer, a first switch, a second switch, a control unit, and an outputting unit. The control unit generates a first drive signal including a first sine wave pulse group for turning on the first switch and a first discharge pulse group. The control unit generates a second drive signal including a second sine wave pulse group for turning on the second switch and a second discharge pulse group. The control unit alternately generates the first sine wave pulse group and the second sine wave pulse group to cause the outputting unit to output the stimulation signal which becomes a pseudo-sine wave. The control unit alternately generates pulses of the first discharge pulse group and pulses of the second discharge pulse group.

3 Claims, 17 Drawing Sheets

(56) References Cited

U.S. PATENT DOCUMENTS

2020/0114147 A1\* 4/2020 Kobayashi ............... A61N 1/36
2021/0213280 A1 7/2021 Kuwahata

FOREIGN PATENT DOCUMENTS

| JP | 3503135 | B2 | 3/2004 |
| JP | 6014824 | B1 | 10/2016 |
| JP | 6488458 | B1 | 3/2019 |
| WO | 2020070914 | A1 | 4/2020 |

\* cited by examiner

|  | Ratio VALUE | DIFFERENCE FROM COMPARATIVE EXAMPLE |
|---|---|---|
| COMPARATIVE EXAMPLE (NO DISCHARGE PULSE) | −24.2dB | — |
| THREE DISCHARGE PULSES EACH | −29.5dB | 5.3dB |
| FIVE DISCHARGE PULSES EACH | −32.5dB | 8.3dB |
| SEVEN DISCHARGE PULSES EACH | −32.1dB | 7.9dB |

FIG. 6

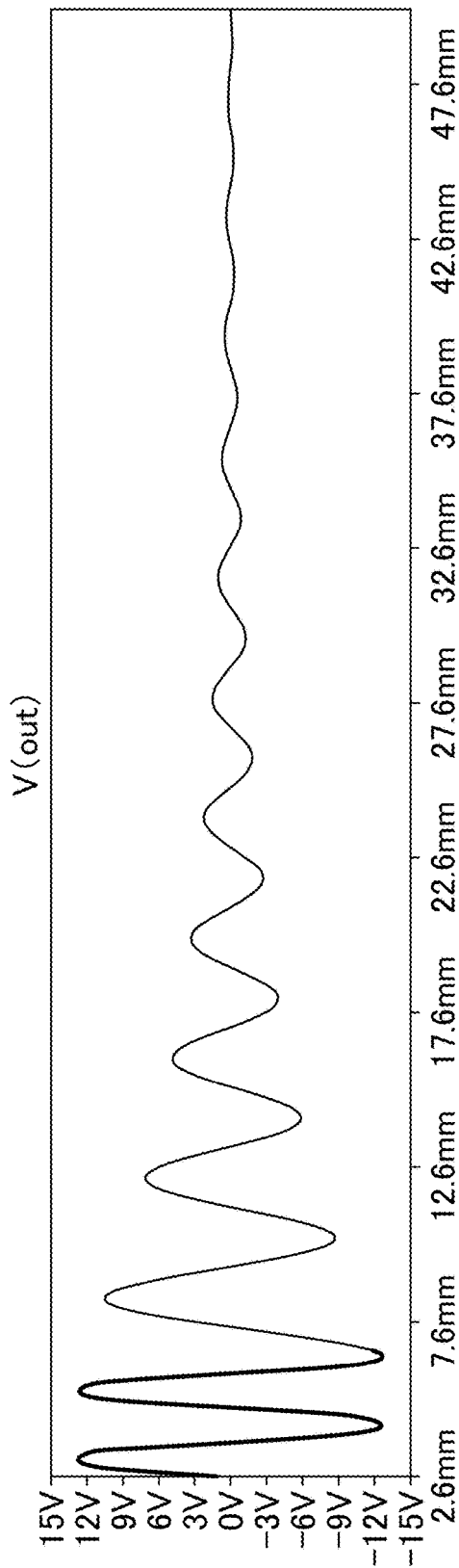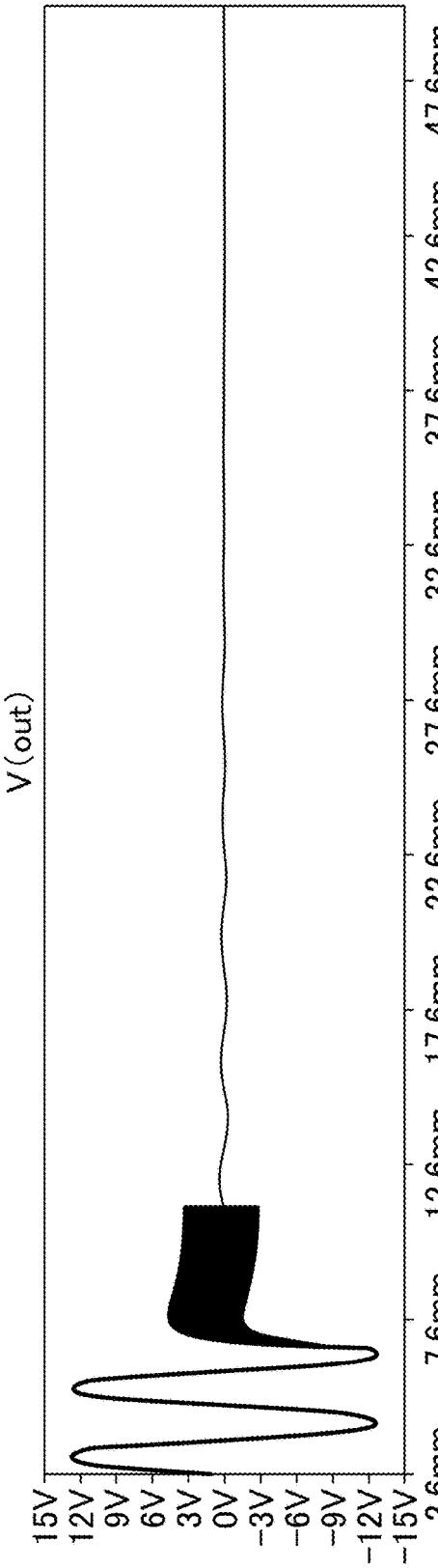
FIG. 9A (CASE WHERE NO DISCHARGE PULSE GROUP GD IS PROVIDED)
FIG. 9B (CASE WHERE DISCHARGE PULSE GROUP GD IS PROVIDED)

LIVING BODY STIMULATION DEVICE

TECHNICAL FIELD

The present invention relates to a living body stimulation device.

The present application claims priority based on Japanese Patent Application No. 2022-160826 filed on Oct. 5, 2022, the contents of which are incorporated herein by reference.

BACKGROUND ART

Living body stimulation devices for outputting stimulation signals to a living body from a conductor element (outputting unit) having a built-in electrode are known in the art. Patent Literature 1 discloses a living body stimulation device which focuses on the fact that a living body has capacitive properties like a capacitor, and employs the action of the living body's capacitive properties to distort pulse groups and thereby form pseudo-sine waves to thus apply stimulation to the living body.

CITATION LIST

Patent Literature

Patent Literature 1: Japanese Patent No. 6488458

SUMMARY

Technical Problem

Patent Literature 1 discloses providing discharge pulses for suppressing pseudo-sine wave distortion created by electric charge accumulated in a living body. However, there are individual differences among capacitive properties of living bodies, and it may be difficult to set discharge pulses in accordance with such individual differences.

An objective of the present invention is to discharge electric charges accumulated in a living body while suppressing the influence of individual differences among living bodies.

Solution to Problem

A main aspect of the invention to achieve the above objective is a living body stimulation device that outputs a stimulation signal to a living body. The living body stimulation device includes: a transformer; a first switch configured to pass, through a primary-side winding of the transformer, a current in a predetermined direction; a second switch configured to pass, through the primary-side winding of the transformer, a current in an opposite direction from the predetermined direction; a control unit configured to generate a first drive signal for driving the first switch and a second drive signal for driving the second switch; and an outputting unit connected to a secondary-side winding of the transformer and configured to output the stimulation signal. The control unit is configured to: generate the first drive signal including a first sine wave pulse group constituted by first pulses for turning on the first switch, and a first discharge pulse group constituted by the first pulses; generate the second drive signal including a second sine wave pulse group constituted by second pulses for turning on the second switch, and a second discharge pulse group constituted by the second pulses; alternately generate the first sine wave pulse group and the second sine wave pulse group, to thereby cause the outputting unit to output the stimulation signal which becomes a pseudo-sine wave; and alternately generate the first pulses of the first discharge pulse group and the second pulses of the second discharge pulse group.

Other features of the present invention are disclosed in the following description and accompanying drawings.

Advantageous Effects of Invention

The present invention is capable of discharging electric charges accumulated in a living body while suppressing the influence of individual differences among living bodies.

BRIEF DESCRIPTION OF DRAWINGS

FIG. 6 illustrates a table comparing peak levels of harmonics with respect to the fundamental wave.

FIG. 9A illustrates an output waveform in a case where no discharge pulse group Gd is provided after the last sine wave pulse group Gs. FIG. 9B illustrates an output waveform in a case where a discharge pulse group Gd is provided after the last sine wave pulse group Gs.

DESCRIPTION OF EMBODIMENTS

Figure 1:
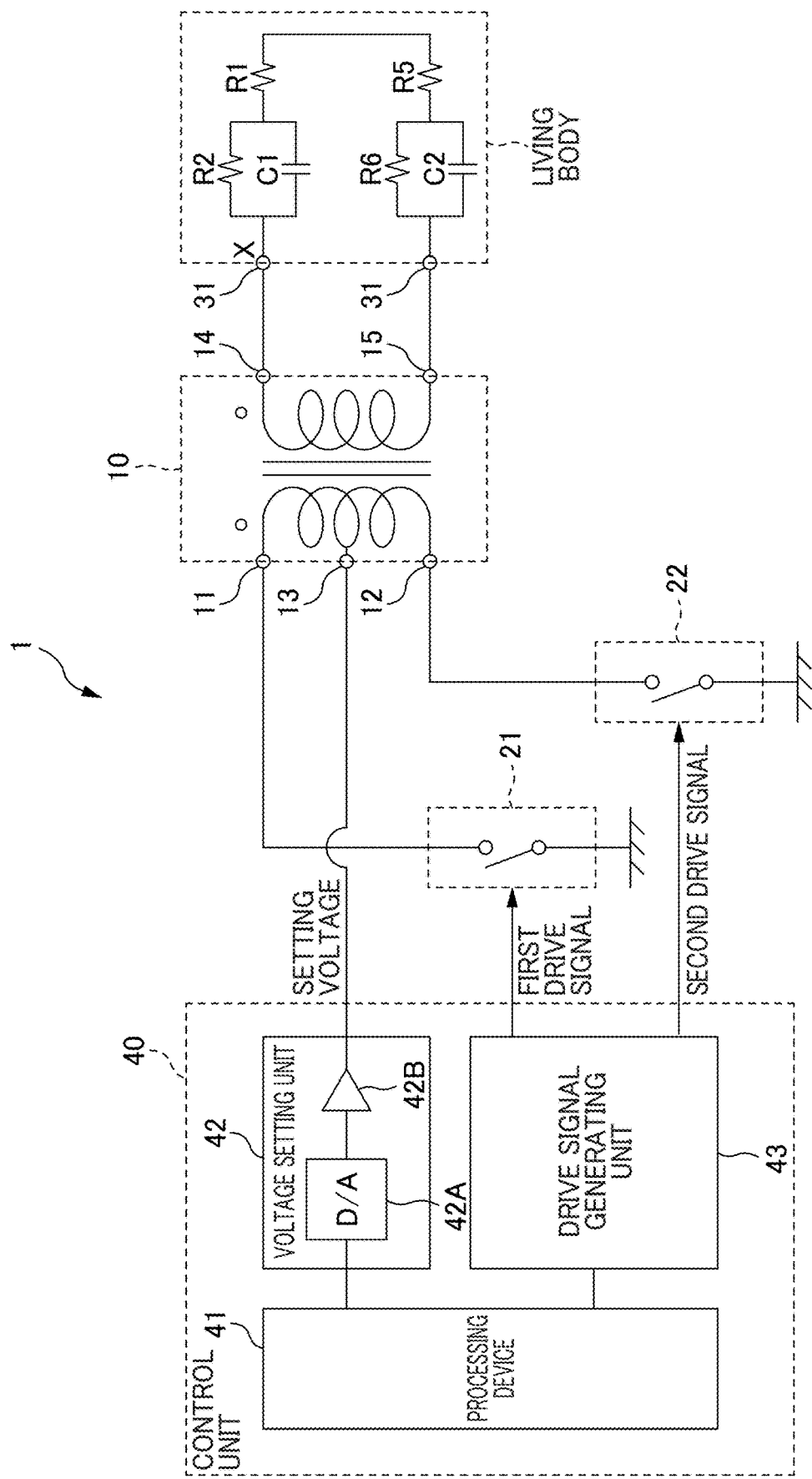
FIG. 1 is a diagram illustrating a configuration of a living body stimulation device 1 according to an embodiment. An equivalent circuit of a living body (e.g., human body) is also illustrated herein.

At least the following features are disclosed in the following description and accompanying drawings.

A first aspect of a living body stimulation device is a living body stimulation device that outputs a stimulation signal to a living body, and that includes: a transformer; a first switch configured to pass, through a primary-side winding of the transformer, a current in a predetermined direction; a second switch configured to pass, through the primary-side winding of the transformer, a current in an opposite direction from the predetermined direction; a control unit configured to generate a first drive signal for driving the first switch and a second drive signal for driving the second switch; and an outputting unit connected to a secondary-side winding of the transformer and configured to output the stimulation signal. The control unit is configured to: generate the first drive signal including a first sine wave pulse group constituted by first pulses for turning on the first switch, and a first discharge pulse group constituted by the first pulses; generate the second drive signal including a second sine wave pulse group constituted by second pulses for turning on the second switch, and a second discharge pulse group constituted by the second pulses; alternately generate the first sine wave pulse group and the second sine wave pulse group, to thereby cause the outputting unit to output the stimulation signal which becomes a pseudo-sine wave; and alternately generate the first pulses of the first discharge pulse group and the second pulses of the second discharge pulse group. With this living body stimulation device, it is possible to discharge electric charges accumulated in a living body while suppressing the influence of individual differences among living bodies.

A second aspect of a living body stimulation device is a living body stimulation device according to the first aspect wherein the control unit is configured to generate the first discharge pulse group immediately before and immediately after the first sine wave pulse group and generate the second discharge pulse group immediately before and immediately after the second sine wave pulse group, to thereby alternately generate the first pulses of the first discharge pulse group and the second pulses of the second discharge pulse group between a timing for generating the first sine wave pulse group and a timing for generating the second sine wave pulse group. In this way, it is possible to discharge electric charges accumulated in a living body and thereby suppress pseudo-sine wave distortion, while suppressing the influence of individual differences among living bodies.

A third aspect of a living body stimulation device is a living body stimulation device according to the first aspect wherein the control unit is configured to generate the first discharge pulse group and the second discharge pulse group after generating a last one of the sine wave pulse groups, to thereby alternately generate the first pulses of the first discharge pulse group and the second pulses of the second discharge pulse group. In this way, it is possible to discharge electric charges accumulated in a living body when pseudo-sine waves are outputted repeatedly, while suppressing the influence of individual differences among living bodies.

A fourth aspect of a living body stimulation device is a living body stimulation device according to the third aspect wherein the control unit is configured to generate either one of the first discharge pulse group and the second discharge pulse group earlier than the other, to thereby generate either one of the first pulses and the second pulses immediately before alternately generating the first pulses of the first discharge pulse group and the second pulses of the second discharge pulse group. In this way, it is possible to quickly discharge electric charges accumulated in a living body.

Embodiments

Basic Configuration:

FIG. 1 is a diagram illustrating a configuration of a living body stimulation device 1 according to the present embodiment. An equivalent circuit of a living body (e.g., human body) is also illustrated herein.

The living body's equivalent circuit is constituted by resistive components R1 and R5, resistive components R2 and R6, and capacitive components C1 and C2. The resistive components R1 and R5 are equivalent to spreading resistance from the living body's skin surface to internal tissue. The resistive components R2 and R6 and the capacitive components C1 and C2, which are connected in parallel, are equivalent to the resistive component of the living body's internal tissue. The living body's equivalent circuit is provided to each of the living body stimulation device 1's outputting units 31 which are provided as a pair.

The living body stimulation device 1 is a device that applies stimulation to a living body by applying a stimulation signal to the body. In general, the higher the frequency of the stimulation signal, the smaller the body impedance and the weaker the sense of muscle stimulation. For example, at high frequencies of 100 kHz or higher, the stimulation signal causes almost no muscle stimulation. In contrast, the lower the frequency of the stimulation signal, the greater the body impedance and the stronger the feeling of stimulation. At low frequencies which offer a feeling of stimulation, the stimulation is softer when the stimulation signal is a sine wave rather than a rectangular wave.

The living body stimulation device 1 includes a transformer 10, a first switch 21, a second switch 22, outputting units 31, and a control unit 40.

The transformer 10 is a converter (transformer) that converts signals between a primary-side winding and a secondary-side winding. The transformer 10 converts electric energy supplied to the primary side into magnetic energy, and then re-converts the magnetic energy into electric energy on the secondary side and outputs the same. A signal inputted to the primary-side winding side may be referred to as "input signal", whereas a signal outputted from the secondary-side winding side (a signal outputted to a living body) may be referred to as "stimulation signal". For example, the transformer 10 boosts the voltage of an input signal (input voltage) by about five to ten times, and outputs the same as a stimulation signal.

The transformer 10 includes a first input terminal 11, a second input terminal 12, a center tap 13, a first output terminal 14, and a second output terminal 15. The first input terminal 11, the second input terminal 12, and the center tap 13 are provided on the primary side of the transformer 10. The first input terminal 11 is a terminal on one-end side of the primary-side winding. The second input terminal 12 is a terminal on the other-end side (the opposite side from the first input terminal) of the primary-side winding. The center tap 13 is a terminal drawn out from an intermediate point of the primary-side winding. Input signals to be inputted to the primary-side winding of the transformer 10 are generated by the first input terminal 11, the second input terminal 12, and the center tap 13. The first output terminal 14 and the second output terminal 15 are provided on the secondary side of the transformer 10. Stimulation signals are outputted from the first output terminal 14 and the second output terminal 15.

The first switch 21 is a switch configured to pass, through the primary-side winding of the transformer 10, a current in a predetermined direction. In this example, the direction in which a current flows through the primary-side winding when the first switch 21 is turned on is the plus direction. The first switch 21 is connected to the first input terminal 11 on one-end side of the primary-side winding of the transformer 10. The first switch 21 is a FET, for example; the drain of the FET, whose source is grounded, is connected to the first input terminal 11, and on/off (energization/non-energization) is controlled according to a signal inputted to the gate. When the first switch 21 is on, a current in the plus direction flows through the primary-side winding. When the first switch 21 is off, the current in the plus direction is interrupted.

The second switch 22 is a switch configured to pass, through the primary-side winding of the transformer 10, a current in the minus direction (opposite direction from the predetermined direction). The direction in which the current flows through the primary-side winding when the second switch 22 is on is in the opposite direction from the direction (predetermined direction; plus direction) in which the current flows through the primary-side winding when the first switch 21 is on. The second switch 22 is a switch connected to the second input terminal 12 on the other-end side (opposite side from the side where the first switch 21 is connected) of the primary-side winding of the transformer 10. Like the first switch 21, the second switch 22 is a FET, for example; the drain of the FET, whose source is grounded, is connected to the second input terminal 12, and on/off is performed according to a signal inputted to the gate. When the second switch 22 is on, a current in the minus direction flows through the primary-side winding. When the second switch 22 is off, the current in the minus direction is interrupted.

The outputting units 31 are electrodes that output a stimulation signal to a living body. The outputting units 31 are respectively connected to the first output terminal 14 and the second output terminal 15 of the secondary-side winding of the transformer 10. Each outputting unit 31 is built into a conductor element (e.g., an adhesive pad, a suction pad, or a metal-rod-shaped or glove-shaped conductor element) to be placed in contact with a living body, and outputs a stimulation signal to the body via the conductor element.

The control unit 40 is a unit (controller) configured to control stimulation signals outputted from the outputting units 31. The control unit 40 controls the driving of the first switch 21 and the second switch 22. Stated differently, the control unit 40 controls the input to the transformer 10 via the first switch 21 and the second switch 22, to thereby control the stimulation signal to be outputted from the outputting units 31. The control unit 40 also controls the voltage (setting voltage) of the center tap 13. By executing a program stored in a storage unit (not illustrated), the control unit 40 executes various types of processing as described further below. In this example, the control unit 40 includes a processing device 41, a voltage setting unit 42, and a drive signal generating unit 43.

The processing device 41 is a processing device 41 such as a CPU or an MPU. The processing device 41 outputs, to the voltage setting unit 42, a setting signal for designating a setting voltage. Also, the processing device 41 outputs, to the drive signal generating unit 43, an instruction signal for instructing the generation of a first drive signal and/or a second drive signal.

The voltage setting unit 42 is a section (circuit) that sets the voltage (setting voltage) of the center tap 13 of the transformer 10. In this example, the voltage setting unit 42 includes a D/A converter 42A and an amplifier 42B. The D/A converter 42A outputs a voltage according to a signal inputted from the processing device 41. The amplifier 42B sets the voltage of the center tap 13 by amplifying the output voltage from the D/A converter 42A. When the setting signal from the processing device 41 changes, the setting voltage of the center tap 13 of the transformer 10 is changed, and thereby the voltage of the stimulation signal is adjusted. For example, the voltage setting unit 42 is capable of adjusting the setting voltage of the center tap 13 within a range from 0 to 12 V. It should be noted that the voltage setting unit 42 does not have to be configured such that the setting voltage to be outputted to the center tap 13 is variable, but may be configured so as to output a constant voltage.

The drive signal generating unit 43 is a signal generating unit (circuit) that generates a first drive signal and a second drive signal. The drive signal generating unit 43 outputs the first drive signal to the first switch 21 (more specifically, the gate of the first switch 21, which is a FET), and outputs the second drive signal to the second switch 22 (more specifically, the gate of the second switch 22, which is a FET). It should be noted that the control unit 40 may be configured such that the processing device 41 outputs the first drive signal and the second drive signal to the first switch 21 and the second switch 22, without providing the drive signal generating unit 43.

Input Signal:

Comparative Example

Figure 12:
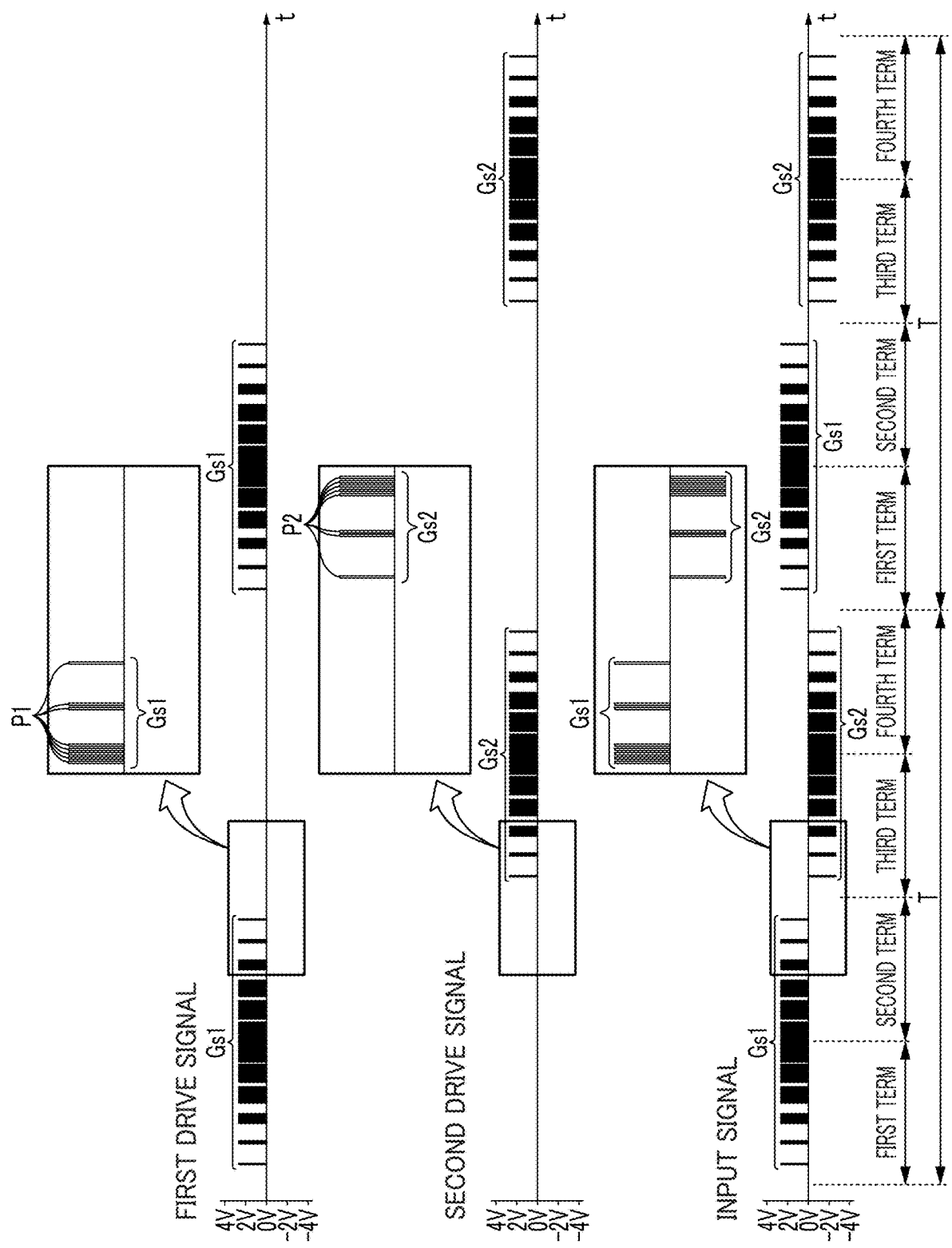
FIG. 12 is a diagram illustrating an input signal according to a comparative example.

FIG. 12 is a diagram illustrating an input signal according to a comparative example. The figure illustrates, in order from above, a first drive signal, a second drive signal, and an input signal. Each of the first drive signal, the second drive signal and the input signal is a signal that repeatedly appears with period T serving as a single cycle. The figure shows each signal worth two periods.

In the following description, the period T (the period worth a single cycle) is divided into four terms, which may respectively be called first to fourth terms. For example, the period T is a period equivalent to a frequency of around 1 to 10 kHz (preferably, a period equivalent to a frequency of around 1 to 3 kHz).

The first drive signal is a signal (drive signal, switch control signal) for driving the first switch 21. When the first drive signal is at a high level (level H), the first switch 21 is turned on, and the setting voltage is applied to the primary-side winding between the first input terminal 11 and the center tap 13 of the transformer 10, thereby causing a current in the plus direction (predetermined direction) to flow through the primary-side winding (energization). When the first drive signal is at a low level (level L), the first switch 21 is turned off, and the current in the plus direction is interrupted (non-energization).

The second drive signal is a signal for driving the second switch 22. When the second drive signal is at a high level (level H), the second switch 22 is turned on, and the setting voltage is applied to the primary-side winding between the second input terminal 12 and the center tap 13 of the transformer 10, thereby causing a current in the minus direction (opposite direction from the predetermined direction) to flow through the primary-side winding. When the second drive signal is at a low level (level L), the second switch 22 is turned off, and the current in the minus direction is interrupted.

The first drive signal and the second drive signal are each a signal in which a pulse group constituted by a plurality of pulses appears at predetermined intervals. In the comparative example illustrated in FIG. 12, the pulse group in the first drive signal and the second drive signal is constituted by a sine wave pulse group Gs for generating a sine wave (pseudo-sine wave). In the following description, the sine wave pulse group Gs of the first drive signal is referred to as "first sine wave pulse group Gs1", and the sine wave pulse group Gs of the second drive signal is referred to as "second sine wave pulse group Gs2". The first sine wave pulse group Gs1 is constituted by pulses (first pulses P1) for turning on the first switch. The second sine wave pulse group Gs2 is constituted by pulses (second pulses P2) for turning on the second switch. Each of the first pulses P1 and second pulses P2 is set so as to have a predetermined pulse width. The period (period T) of the sine wave pulse group Gs (Gs1, Gs2) is relatively long, whereas the period of the pulses (first pulses P1 or second pulses P2) constituting the sine wave pulse group Gs is relatively short. The first sine wave pulse group Gs1 of the first drive signal and the second sine wave pulse group Gs2 of the second drive signal are generated alternately. Thus, the first switch 21 and the second switch 22 perform high-frequency switching operation alternately. It should be noted that the energization term of the first sine wave pulse group Gs1 of the first drive signal does not overlap with the energization term of the second sine wave pulse group Gs2 of the second drive signal; during the energization term of the sine wave pulse group Gs of one of the drive signals, the sine wave pulse group Gs of the other drive signal will be in a halt term. In the first term and the second term, the first sine wave pulse group Gs1 of the first drive signal is in the energization term, whereas the second sine wave pulse group Gs2 of the second drive signal is in the halt term. In the third term and the fourth term, the first sine wave pulse group Gs1 of the first drive signal is in the halt term, whereas the second sine wave pulse group Gs2 of the second drive signal is in the energization term. As described above, the phase of the first drive signal and that of the second drive signal are shifted by 180 degrees from one another.

In the first term (the former half of the energization term of the first drive signal), the pulse density of the first sine wave pulse group Gs1 of the first drive signal gradually increases (the number of pulses per unit time gradually increases), and in the second term (the latter half of the energization term of the first drive signal), the pulse density gradually decreases (the number of pulses per unit time gradually decreases). The first sine wave pulse group Gs1 in the second term changes over time in a manner that the change-over-time thereof is reverse of the change-over-time of the first sine wave pulse group Gs1 in the first term. Stated differently, as illustrated in the graph of FIG. 12, the graph of the first sine wave pulse group Gs1 in the first term and the graph of the first sine wave pulse group Gs1 in the second term are symmetrical with respect to the boundary between the first term and the second term.

In the third term (the former half of the energization term of the second drive signal), the pulse density of the second sine wave pulse group Gs2 of the second drive signal gradually increases (the number of pulses per unit time gradually increases), and in the fourth term (the latter half of the energization term of the second drive signal), the pulse density gradually decreases (the number of pulses per unit time gradually decreases). The second sine wave pulse group Gs2 in the fourth term changes over time in a manner that the change-over-time thereof is reverse of the change-over-time of the second sine wave pulse group Gs2 in the third term. Stated differently, as illustrated in the graph of FIG. 12, the graph of the second sine wave pulse group Gs2 in the third term and the graph of the second sine wave pulse group Gs2 in the fourth term are symmetrical with respect to the boundary between the third term and the fourth term. It should be noted that the change-over-time of the second sine wave pulse group Gs2 of the second drive signal in the third term is the same as the change-over-time of the first sine wave pulse group Gs1 of the first drive signal in the first term. Further, the change-over-time of the second sine wave pulse group Gs2 of the second drive signal in the fourth term is the same as the change-over-time of the first sine wave pulse group Gs1 of the first drive signal in the second term.

The aforementioned first drive signal and second drive signal (and setting voltage) are inputted to the primary-side winding of the transformer 10. The first switch 21 is turned on by the first pulses P1 of the first drive signal and a setting voltage is applied to the primary-side winding between the first input terminal 11 and the center tap 13 of the transformer 10, and thereby a current passes through the primary-side winding in the plus direction (predetermined direction). On the other hand, the second switch 22 is turned on by the second pulses P2 of the second drive signal and a setting voltage is applied to the primary-side winding between the second input terminal 12 and the center tap 13 of the transformer 10, and thereby a current passes through the primary-side winding in the minus direction (the opposite direction of the predetermined direction). In this way, the input signal illustrated in FIG. 12 is inputted to the primary-side winding of the transformer 10.

The input signal is a signal to be inputted to the primary-side winding of the transformer 10. The input signal illustrated in FIG. 12 is a signal created by superposing the first drive signal, which is on the plus side, and the second drive signal, which is on the minus side. In the input signal, the first sine wave pulse group Gs1 and the second sine wave pulse group appear alternately at predetermined intervals.

Figure 13A:
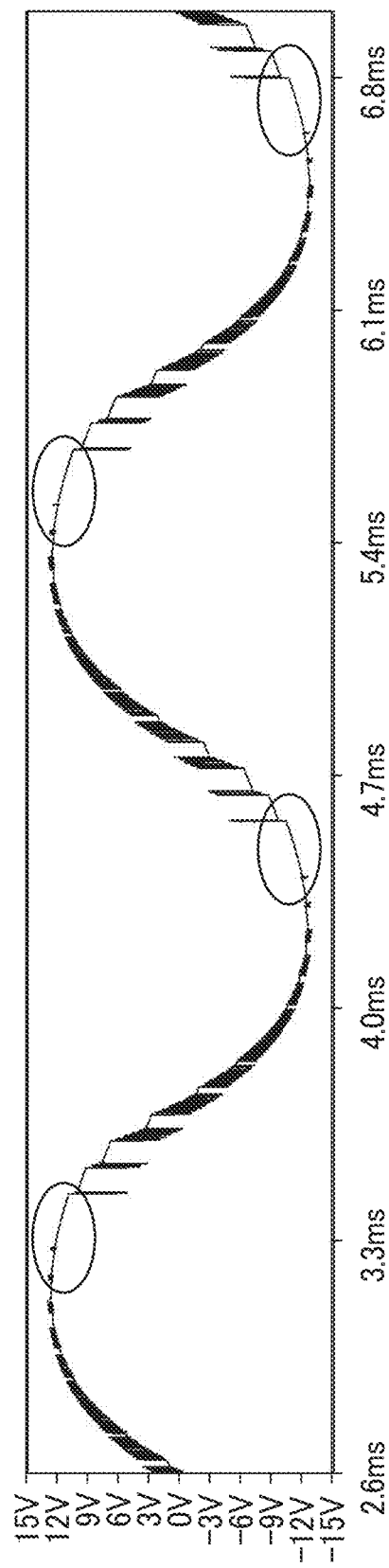
FIG. 13A is a graph of a stimulation signal of the comparative example when a living body is connected to outputting units 31.
Figure 13B:
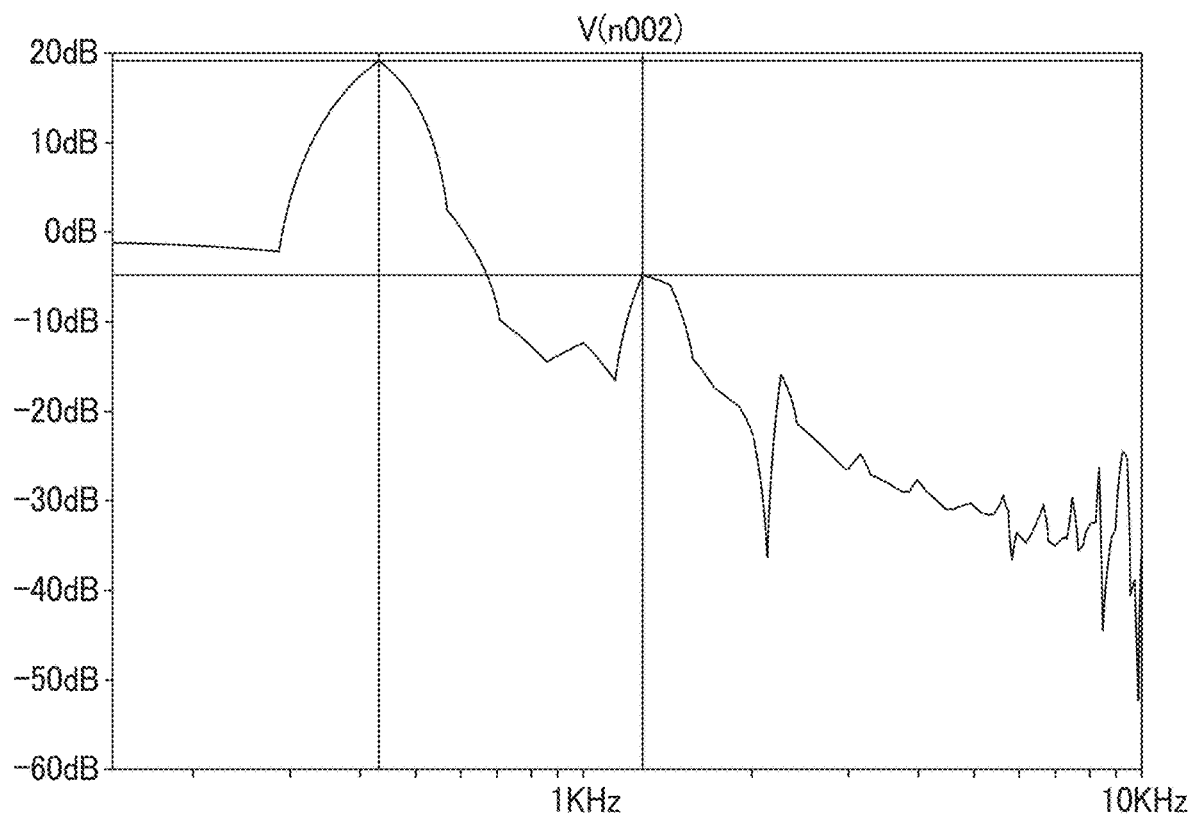
FIG. 13B is a graph illustrating a FFT analysis result of FIG. 13A.

FIG. 13A is a graph of a stimulation signal of the comparative example when a living body (more specifically, an equivalent circuit of a living body) is connected to the outputting units 31. The graph in the figure shows an output waveform at the outputting unit 31 (i.e., the change-over-time of the potential at Point X in FIG. 1). FIG. 13B is a graph illustrating a FFT analysis result of FIG. 13A.

As illustrated in FIG. 13A, due to the capacitive component of the living body, the voltage of the stimulation signal gradually increases in the first term and the second term in which the first sine wave pulse group Gs1 appears, and gradually decreases in the third term and the fourth term in which the second sine wave pulse group Gs2 appears. The capacitive component of the living body is charged in the second term in which the first sine wave pulse group Gs1 appears, and is discharged in the third term in which the second sine wave pulse group Gs2 appears. Also, the capacitive component of the living body is inversely charged in the fourth term in which the second sine wave pulse group Gs2 appears, and is discharged in the first term in which the first sine wave pulse group Gs1 appears.

In the first term, the pulse density of the first pulses P1 gradually increases, and thus, the change in voltage of the stimulation signal (the slope of the graph) in the first term becomes gradually steeper, whereas in the second term, the pulse density of the first pulses P1 gradually decreases, and thus, the change in voltage of the stimulation signal (the slope of the graph) in the second term becomes gradually gentler. Also, in the third term, the pulse density of the second pulses P2 gradually increases, and thus, the change in voltage of the stimulation signal in the third term becomes gradually steeper, whereas in the fourth term, the pulse density of the second pulses P2 gradually decreases, and thus, the change in voltage of the stimulation signal in the fourth term becomes gradually gentler. As a result, as illustrated in FIG. 13A, the stimulation signal, which is distorted by the action of the body's capacitive properties, exhibits a waveform that is analogous to a sine wave (i.e., a pseudo-sine wave).

Further, in the description above, the pulse density of the first drive signal is changed over time in the second term in a manner that the change-over-time thereof is reverse of the change-over-time of the pulse density of the first drive signal in the first term, and the pulse density of the second drive signal is changed over time in the fourth term in a manner that the change-over-time thereof is reverse of the change-over-time of the pulse density of the second drive signal in the third term. This is done so that the distorted stimulation signal becomes analogous to a sine wave. Further, the change-over-time of the pulse density of the first drive signal in the first term is the same as the change-over-time of the pulse density of the second drive signal in the third term, and the change-over-time of the pulse density of the first drive signal in the second term is the same as the change-over-time of the pulse density of the second drive signal in the fourth term. This is also done so that the distorted stimulation signal becomes analogous to a sine wave. This is why the pulse groups in the first drive signal and the second drive signal in FIG. 12 are referred to as "sine wave pulse groups".

As regards the living body's reactance characteristics, there is a difference between charging resistance and discharging resistance, and charging of the living body's capacitive component is relatively fast, whereas discharging is relatively slow. This imbalance in charging/discharging creates a state wherein the pseudo-sine wave's waveform is distorted by the discharging delay in the vicinity of the peaks (the highest potential points or the lowest potential points) of the pseudo-sine wave, as indicated by the regions surrounded by ellipses in FIG. 13A. As a result, as shown in FIG. 13B, the peak level of the harmonic (the third-order harmonic in this example) becomes relatively high (−24.2 dB in this example). However, in order to provide a soft stimulation to the body, it is desirable to suppress distortions in the sine wave (i.e., desirable to make the waveform of the stimulation signal analogous to a sine wave), and desirable to suppress the harmonic (i.e., to decrease the peak level of the harmonic).

First Embodiment

Figure 2:
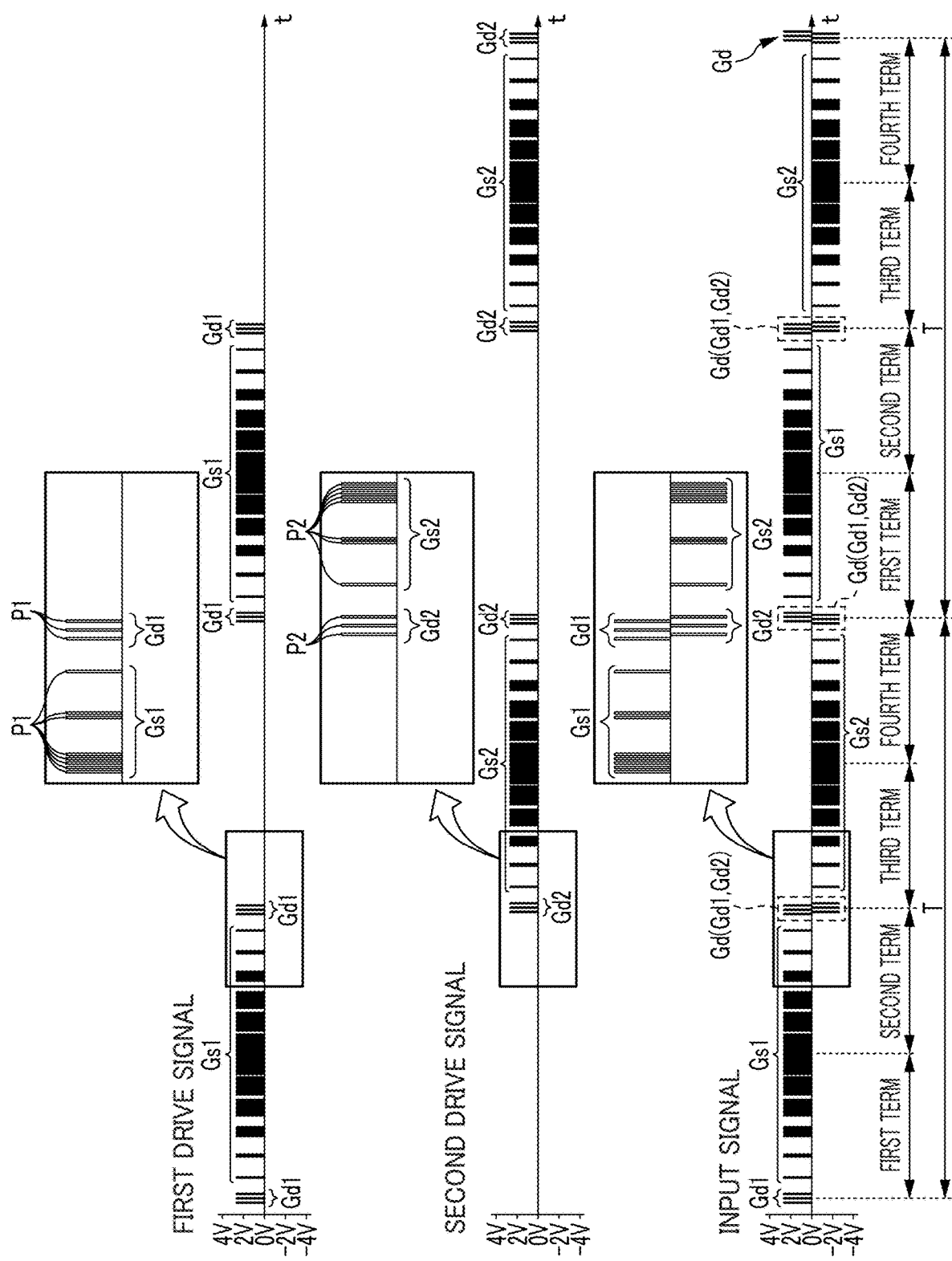
FIG. 2 is a diagram illustrating an input signal according to a first embodiment.

FIG. 2 is a diagram illustrating an input signal according to a first embodiment. The figure illustrates, in order from above, a first drive signal, a second drive signal, and an input signal.

The first drive signal includes a first sine wave pulse group Gs1 and a first discharge pulse group Gd1. The second drive signal includes a second sine wave pulse group Gs2 and a second discharge pulse group Gd2.

The first sine wave pulse group Gs1 of the first drive signal is the same as the first sine wave pulse group Gs1 of the first drive signal in the comparative example, and is a pulse group for shaping a stimulation signal in a pseudo-sine wave. The first sine wave pulse group Gs1 is constituted by first pulses P1 for turning on the first switch. In the first term (the former half of the energization term of the first drive signal), the pulse density of the first sine wave pulse group Gs1 gradually increases (the number of pulses per unit time gradually increases), and in the second term (the latter half of the energization term of the first drive signal), the pulse density gradually decreases (the number of pulses per unit time gradually decreases). The first sine wave pulse group Gs1 in the second term changes over time in a manner that the change-over-time thereof is reverse of the change-over-time of the first sine wave pulse group Gs1 in the first term. Stated differently, in the graph of the first drive signal of FIG. 2, when focusing on the first sine wave pulse group Gs1 (excluding the discharge pulses), the graph of the first sine wave pulse group Gs1 in the first term and the graph of the first sine wave pulse group Gs1 in the second term are symmetrical with respect to the boundary between the first term and the second term.

The second sine wave pulse group Gs2 of the second drive signal is the same as the second sine wave pulse group Gs2 of the second drive signal in the comparative example, and is a pulse group for shaping a stimulation signal in a pseudo-sine wave. The second sine wave pulse group Gs2 is constituted by second pulses P2 for turning on the second switch. In the third term (the former half of the energization term of the second drive signal), the pulse density of the second sine wave pulse group Gs2 gradually increases (the number of pulses per unit time gradually increases), and in the fourth term (the latter half of the energization term of the second drive signal), the pulse density gradually decreases (the number of pulses per unit time gradually decreases). The second sine wave pulse group Gs2 in the fourth term changes over time in a manner that the change-over-time thereof is reverse of the change-over-time of the second sine wave pulse group Gs2 in the third term. Stated differently, in the graph of the second drive signal of FIG. 2, when focusing on the second sine wave pulse group Gs2 (excluding the discharge pulses), the graph of the second sine wave pulse group Gs2 in the third term and the graph of the second sine wave pulse group Gs2 in the fourth term are symmetrical with respect to the boundary between the third term and the fourth term. It should be noted that the change-over-time of the second sine wave pulse group Gs2 of the second drive signal in the third term is the same as the change-over-time of the first sine wave pulse group Gs1 of the first drive signal in the first term. Further, the change-over-time of the second sine wave pulse group Gs2 of the second drive signal in the fourth term is the same as the change-over-time of the first sine wave pulse group Gs1 of the first drive signal in the second term.

It should be noted that, in the first drive signal illustrated in the figure, the ratio of the duration that the signal assumes the high level (level H) per unit time gradually increases in the first term, whereas the ratio of the duration that the signal assumes the high level per unit time gradually decreases in the second term, in accordance with pulse density modulation (PDM). Similarly, in the second drive signal illustrated in the figure, the ratio of the duration that the signal assumes the high level per unit time gradually increases in the third term, whereas the ratio of the duration that the signal assumes the high level per unit time gradually decreases in the fourth term, in accordance with pulse density modulation. Note, however, that the ratio of the duration that the signal assumes the high level per unit time may be increased/decreased according to pulse width modulation (PWM) instead of pulse density modulation.

The respective discharge pulse groups Gd (the first discharge pulse group Gd1 and the second discharge pulse group Gd2) of the first drive signal and the second drive signal are pulse groups provided before and after each sine wave pulse group Gs (Gs1, Gs2). Each discharge pulse group Gd is constituted by a plurality of pulses. Herein, the discharge pulse group Gd of the first drive signal is referred to as the first discharge pulse group Gd1, and the discharge pulse group Gd of the second drive signal is referred to as the second discharge pulse group Gd2. The first discharge pulse group Gd1 is constituted by the first pulses P1 for turning on the first switch. The second discharge pulse group Gd2 is constituted by the second pulses P2 for turning on the second switch.

The first discharge pulse group Gd1 is provided immediately before and immediately after the first sine wave pulse group Gs1. The timing for the first discharge pulse group Gd1 is either a timing between the last first pulse P1 of the first sine wave pulse group Gs1 and the first second pulse P2 of the second sine wave pulse group Gs2, or a timing between the last second pulse P2 of the second sine wave pulse group Gs2 and the first first pulse P1 of the first sine wave pulse group Gs1. Hence, the first discharge pulse group Gd1 is provided in the vicinity of the boundary between the second term and the third term and in the vicinity of the boundary between the fourth term and the first term.

The first pulse P1 is a pulse signal for turning on the first switch 21. During the time period of the first pulse P1, the first drive signal assumes a high level (level H), and the first switch 21 is turned on. The first discharge pulse group Gd1 is constituted by a plurality of first pulses P1; hence, during the time period that the first discharge pulse group Gd1 is being generated, the first switch 21 is turned on and off repeatedly. The first discharge pulse group Gd1 illustrated in FIG. 2 is constituted by three first pulses P1. Note, however, that the number of first pulses P1 constituting the first discharge pulse group Gd1 is not limited to three, as will be described further below.

The second discharge pulse group Gd2 is provided immediately before and immediately after the second sine wave pulse group Gs2. The timing for the second discharge pulse group Gd2 is either a timing between the last second pulse P2 of the second sine wave pulse group Gs2 and the first first pulse P1 of the first sine wave pulse group Gs1, or a timing between the last first pulse P1 of the first sine wave pulse group Gs1 and the first second pulse P2 of the second sine wave pulse group Gs2. Hence, like the first discharge pulse group Gd1, the second discharge pulse group Gd2 is provided in the vicinity of the boundary between the second term and the third term and in the vicinity of the boundary between the fourth term and the first term.

The second pulse P2 is a pulse signal for turning on the second switch 22. During the time period of the second pulse P2, the second drive signal assumes a high level (level H), and the second switch 22 is turned on. The second discharge pulse group Gd2 is constituted by a plurality of second pulses P2; hence, during the time period that the second discharge pulse group Gd2 is being generated, the second switch 22 is turned on and off repeatedly. The second discharge pulse group Gd2 illustrated in FIG. 2 is constituted by three second pulses P2. Note, however, that the number of second pulses P2 constituting the second discharge pulse group Gd2 is not limited to three, as will be described further below.

The first discharge pulse group Gd1 and the second discharge pulse group Gd2 are generated concurrently in the vicinity of the boundary between the first sine wave pulse group Gs1 of the first drive signal and the second sine wave pulse group Gs2 of the second drive signal. The time period during which the first discharge pulse group Gd1 is generated overlaps the time period during which the second discharge pulse group Gd2 is generated. Note, however, that as can be understood from the enlarged diagram of the input signal in FIG. 2, the first pulses P1 of the first discharge pulse group Gd1 and the second pulses P2 of the second discharge pulse group Gd2 are generated alternately, and are generated at different timings from one another. Hence, the first pulse P1 and the second pulse P2 are not generated simultaneously (i.e., the first drive signal and the second drive signal do not assume the high level simultaneously). As can be understood from the enlarged diagram of the input signal in FIG. 2, a second pulse P2 is generated between one first pulse P1 and another first pulse P1. Similarly, a first pulse P1 is generated between one second pulse P2 and another second pulse P2. Stated differently, in a time period during which the first discharge pulse group Gd1 and the second discharge pulse group Gd2 are generated, there is a time period (energization period) in which the second drive signal assumes the high level during the time period (halt term) in which the first drive signal assumes the low level (level L). Also, in a time period during which the first discharge pulse group Gd1 and the second discharge pulse group Gd2 are generated, there is a time period (energization period) in which the first drive signal assumes the high level during the time period (halt term) in which the second drive signal assumes the low level.

In the first embodiment, by generating the first discharge pulse group Gd1 immediately before and immediately after the first sine wave pulse group Gs1 and generating the second discharge pulse group Gd2 immediately before and immediately after the second sine wave pulse group Gs2, the discharge pulse group Gd—which is constituted by the first discharge pulse group Gd1 and the second discharge pulse group Gd2—is generated between a timing for generating the first sine wave pulse group Gs1 and a timing for generating the second sine wave pulse group Gs2. Stated differently, as illustrated in the input signal of FIG. 2, the discharge pulse group Gd (the first discharge pulse group Gd1 and the second discharge pulse group Gd2) is provided in the vicinity of the boundary between the second term and the third term and in the vicinity of the boundary between the fourth term and the first term. In this way, the discharge pulse group Gd is provided between a timing for generating the first sine wave pulse group Gs1 and a timing for generating the second sine wave pulse group Gs2. Thus, the first pulses P1 of the first discharge pulse group Gd1 and the second pulses P2 of the second discharge pulse group Gd2 are generated alternately between a timing for generating the first sine wave pulse group Gs1 and a timing for generating the second sine wave pulse group Gs2.

Figure 3A:
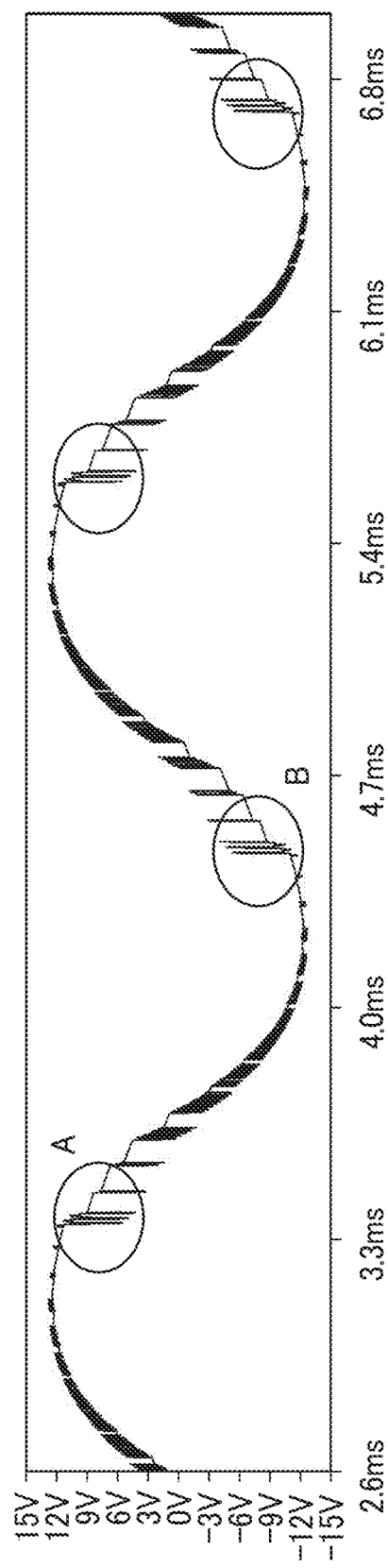
FIG. 3A is a graph of a stimulation signal of the first embodiment when a living body is connected to outputting units 31.
Figure 3B:
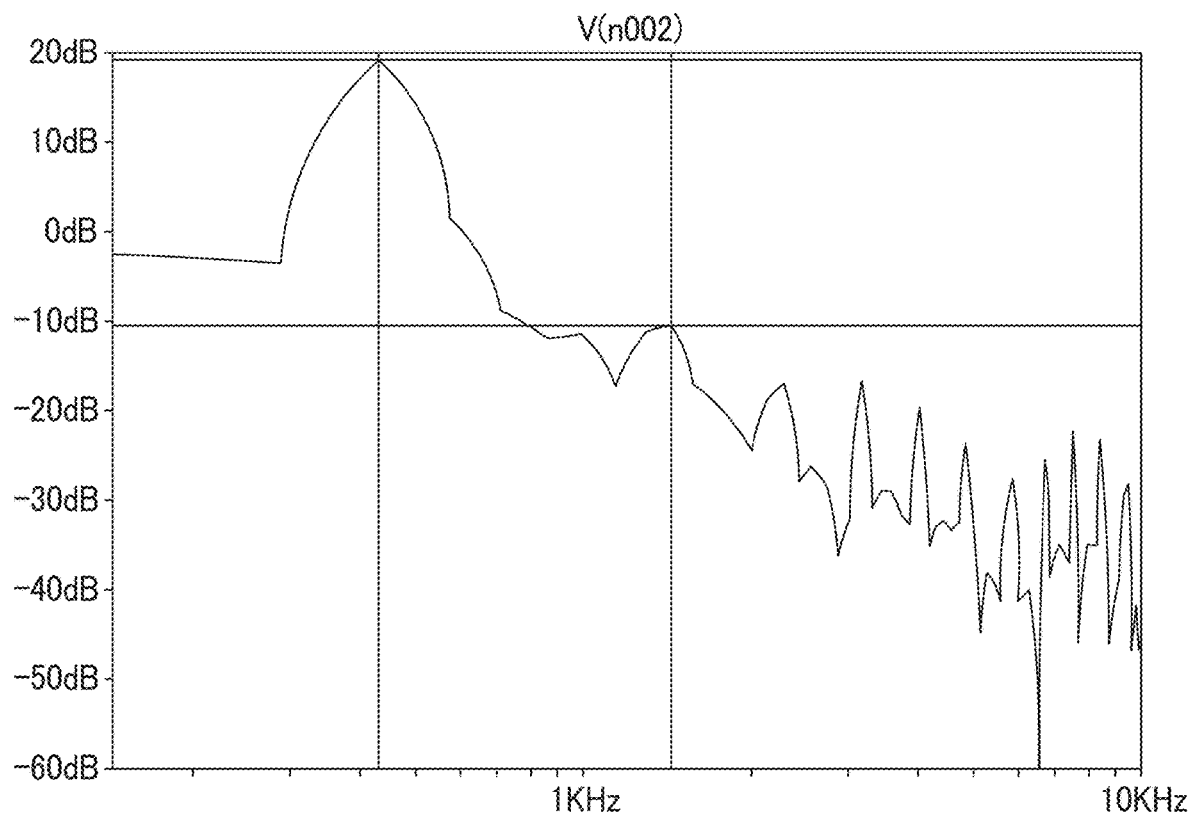
FIG. 3B is a graph illustrating a FFT analysis result of FIG. 3A.

FIG. 3A is a graph of a stimulation signal of the first embodiment when a living body (more specifically, an equivalent circuit of a living body) is connected to the outputting units 31. The graph in the figure shows an output waveform at the outputting unit 31 (i.e., the change-over-time of the potential at Point X in FIG. 1). FIG. 3B is a graph illustrating a FFT analysis result of FIG. 3A.

As illustrated in FIG. 3A, the stimulation signal, which is distorted by the action of the body's capacitive properties, exhibits a waveform that is analogous to a sine wave (i.e., a pseudo-sine wave), substantially similarly to the comparative example. In the first embodiment, as indicated by the regions surrounded by ellipses in the figure, the discharging delay is remedied in the vicinity of the peaks (the highest potential points or the lowest potential points) of the pseudo-sine wave, and distortion of the sinusoidal shape is suppressed. As a result, the peak level of the harmonic with respect to the fundamental wave is approximately −29.5 dB in the first embodiment—in contrast to approximately −24.2 dB in the comparative example (see FIG. 13B)—which is a reduction of approximately 5.3 dB. Also, the FFT analysis result shows that the discharge pulse group Gd (Gd1, Gd2) of the first embodiment can suppress distortions in the waveform of the pseudo-sine wave (stimulation signal). By suppressing distortions in the sine wave and making the waveform of the stimulation signal more analogous to a sine wave in this way, it is possible to soften the stimulation imparted to the body.

In the vicinity of the highest potential point in the pseudo-sine wave shown in Region A of FIG. 3A, the influence caused by the second pulses P2 is greater than the influence caused by the first pulses P1. Stated differently, in the vicinity of the highest potential point in the pseudo-sine wave shown in Region A, the amount of change (increase amount) in the stimulation signal's potential when the first pulses P1 are inputted is small, whereas the amount of change (decrease amount) in the stimulation signal's potential when the second pulses P2 are inputted is large. Hence, in the vicinity of the highest potential point in the pseudo-sine wave shown in Region A, the discharging delay can be remedied and distortion of the sinusoidal shape can be suppressed, even when the first pulses P1 of the first discharge pulse group Gd1 and the second pulses P2 of the second discharge pulse group Gd2 are generated alternately.

Similarly, in the vicinity of the lowest potential point in the pseudo-sine wave shown in Region B of FIG. 3A, the influence caused by the first pulses P1 is greater than the influence caused by the second pulses P2. Stated differently, in the vicinity of the lowest potential point in the pseudo-sine wave shown in Region B, the amount of change (decrease amount) in the stimulation signal's potential when the second pulses P2 are inputted is small, whereas the amount of change (increase amount) in the stimulation signal's potential when the first pulses P1 are inputted is large. Hence, in the vicinity of the lowest potential point in the pseudo-sine wave shown in Region B, the discharging delay can be remedied and distortion of the sinusoidal shape can be suppressed, even when the first pulses P1 of the first discharge pulse group Gd1 and the second pulses P2 of the second discharge pulse group Gd2 are generated alternately.

Incidentally, in order to suppress distortions in the vicinity of the highest potential point in the pseudo-sine wave, it is conceivable to generate only the second pulses P2 as the discharge pulse group Gd, without generating the first pulses P1. Likewise, in order to suppress distortions in the vicinity of the lowest potential point in the pseudo-sine wave, it is conceivable to generate only the first pulses P1 as the discharge pulse group Gd, without generating the second pulses P2. However, in cases where the discharge pulse group Gd is constituted only by pulses with either one of the polarities (monopolar pulses), it is difficult to set the discharge pulse group Gd so that discharging can be conducted suitably for each individual, because there are individual differences among capacitive properties of living bodies. For example, in cases where the discharge pulse group Gd is configured to suit an individual that is hard to discharge, if the living body stimulation device is used with respect to an individual that is easily discharged, the discharge pulse group Gd will conduct excessive discharging, and the pseudo-sine wave may contrarily distort the pseudo-sine wave. In contrast, in the present embodiment, the discharge pulses are configured by both the first pulses P1 and the second pulses P2 (i.e., bipolar pulses) in the vicinity of the peaks (the highest potential points or the lowest potential points) of the pseudo-sine wave, by making use of the fact that the influence imparted by either one of the first pulses P1 and the second pulses P2 becomes greater than the influence of the other. Thus, it is possible to suppress situations where excessive discharging is conducted and to set the discharge pulses such that suitable discharging can be conducted for any individual.

In FIG. 2, there are three first pulses P1 in the first discharge pulse group Gd1 and three second pulses P2 in the second discharge pulse group Gd2 (see FIG. 2). Note, however, that the number of first pulses P1 and second pulses P2 is not limited to three.

Figure 4A:
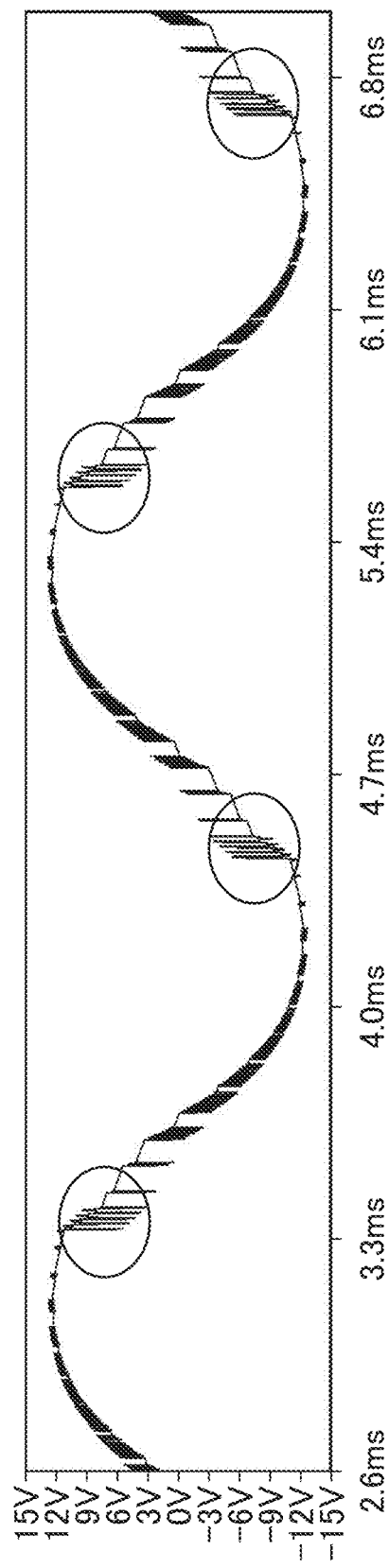
FIG. 4A is a graph of a stimulation signal in a case where the discharge pulse group Gd is constituted by five first pulses P1 and five second pulses P2.
Figure 4B:
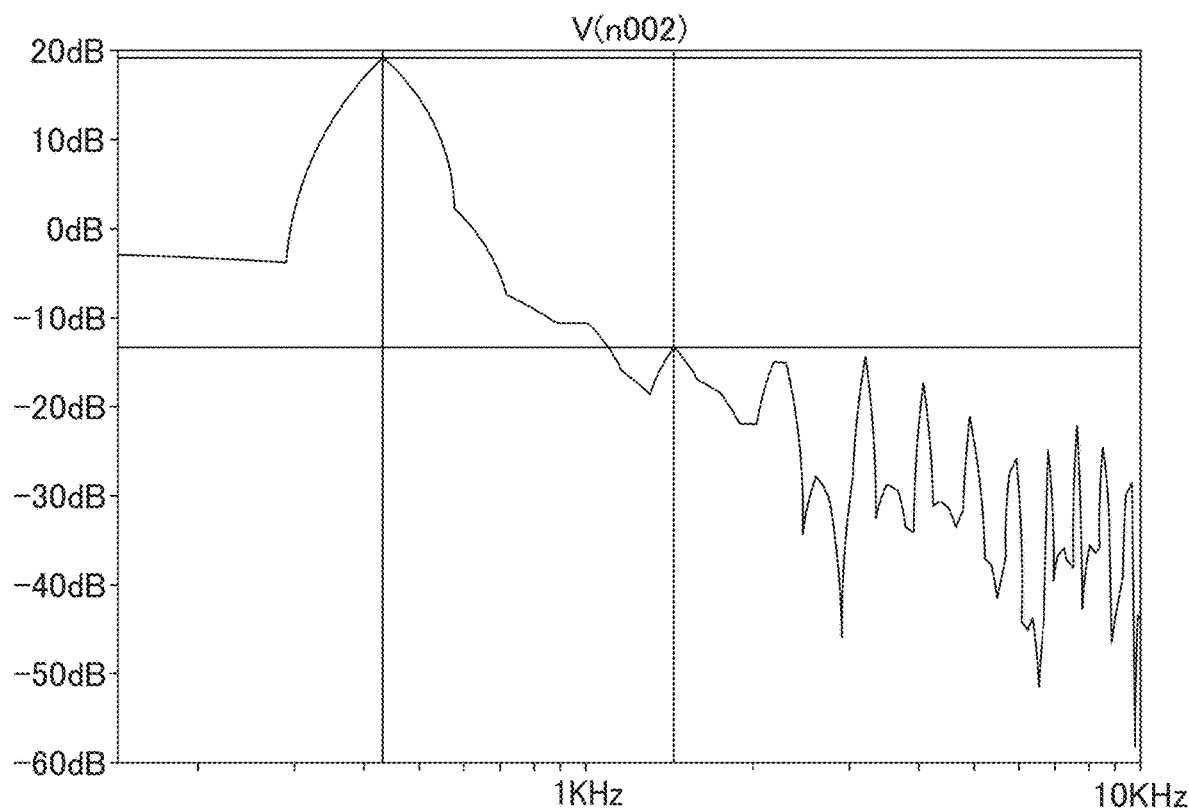
FIG. 4B is a graph illustrating a FFT analysis result of FIG. 4A.
Figure 5A:
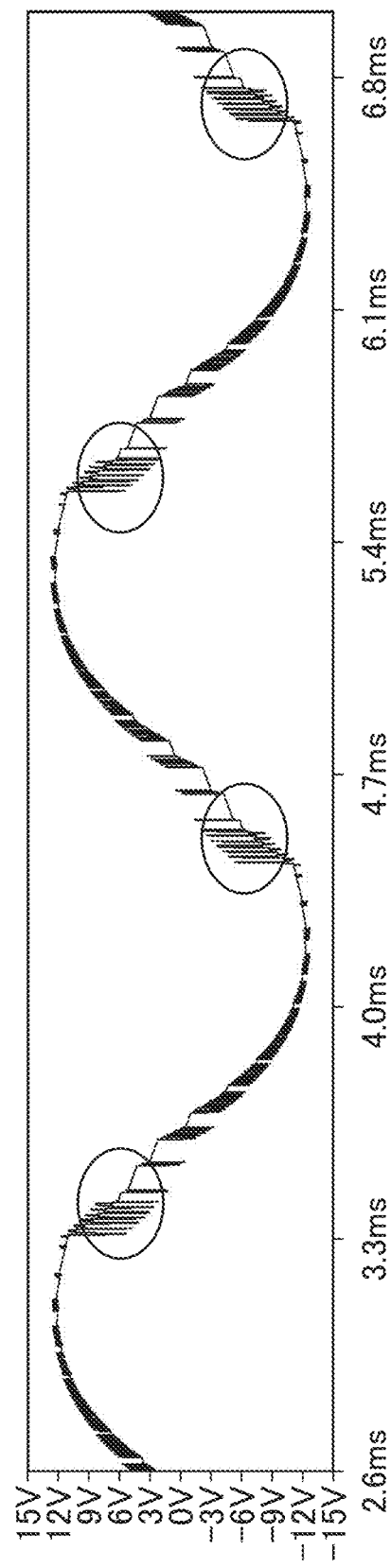
FIG. 5A is a graph of a stimulation signal in a case where the discharge pulse group Gd is constituted by seven first pulses P1 and seven second pulses P2.
Figure 5B:
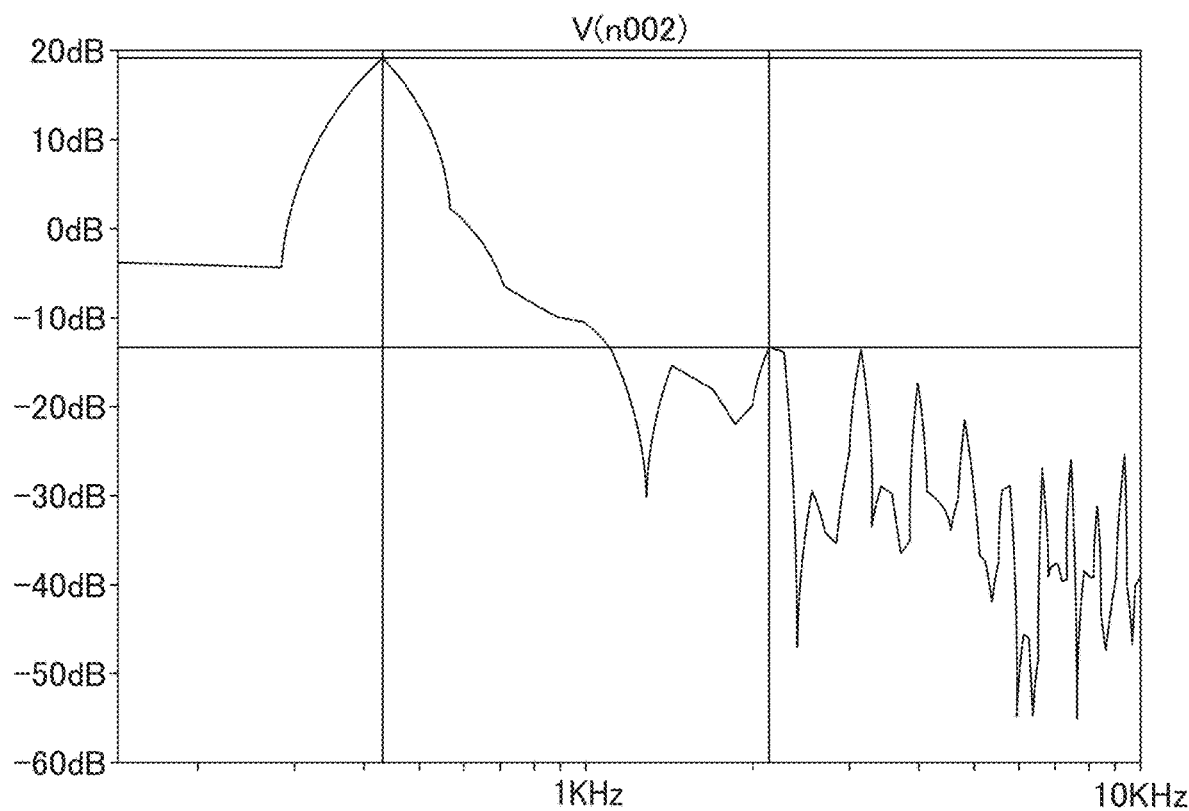
FIG. 5B is a graph illustrating a FFT analysis result of FIG. 5A.

FIG. 4A is a graph of a stimulation signal in a case where the discharge pulse group Gd is constituted by five first pulses P1 and five second pulses P2. FIG. 4B is a graph illustrating a FFT analysis result of FIG. 4A. FIG. 5A is a graph of a stimulation signal in a case where the discharge pulse group Gd is constituted by seven first pulses P1 and seven second pulses P2. FIG. 5B is a graph illustrating a FFT analysis result of FIG. 5A.

As indicated by the regions surrounded by ellipses in FIGS. 4A and 5A, the discharging delay is remedied in the vicinity of the peaks (the highest potential points or the lowest potential points) of the pseudo-sine wave, and distortion of the sinusoidal shape is suppressed. As indicated by these examples, even when the number of first pulses P1 and second pulses P2 constituting the discharge pulse group Gd is varied, it is possible to remedy discharging delays and suppress distortions in the sinusoidal shape in the vicinity of the peaks in the pseudo-sine wave.

FIG. 6 illustrates a table comparing peak levels of harmonics with respect to the fundamental wave.

In the case where the discharge pulse group Gd is constituted by five first pulses P1 and five second pulses P2 (see FIG. 4B), the peak level of the harmonic with respect to the fundamental wave is approximately −32.5 dB—in contrast to −24.2 dB in the comparative example (see FIG. 13B)—which is a reduction of approximately 8.3 dB. In the case where the discharge pulse group Gd is constituted by seven first pulses P1 and seven second pulses P2 (see FIG. 5B), the peak level of the harmonic is approximately −32.1 dB, which is a reduction of approximately 7.9 dB. (Note that, in the case where the discharge pulse group Gd is constituted by three first pulses P1 and three second pulses P2, the peak level of the harmonic is approximately −29.5 dB, which is a reduction of approximately 5.3 dB, as described above.) The FFT analysis results show that, even when the number of first pulses P1 and second pulses P2 constituting the discharge pulse group Gd is varied, the discharge pulse group Gd of the first embodiment can suppress distortions in the waveform of the pseudo-sine wave (stimulation signal).

Second Embodiment

Figure 7:
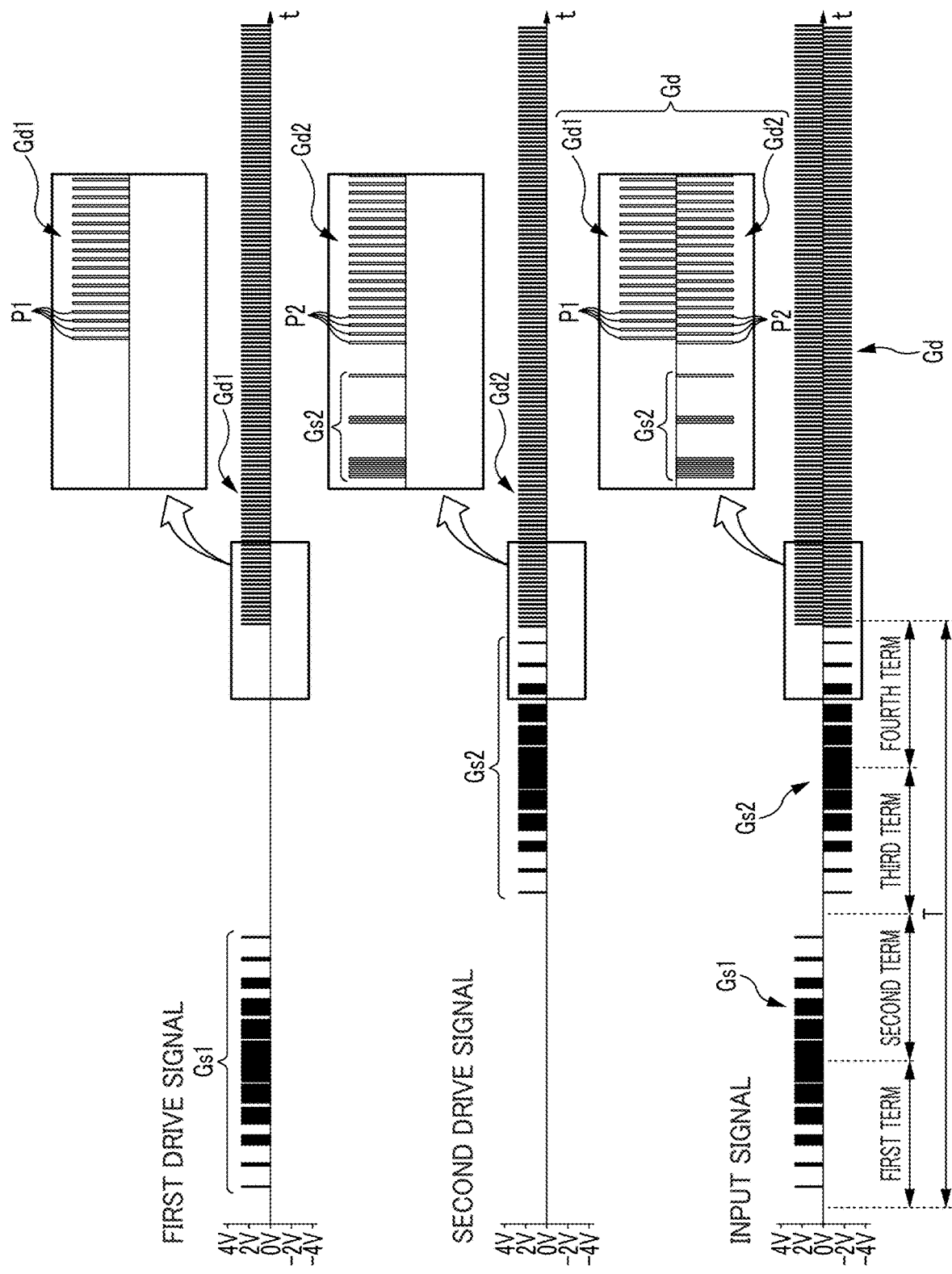
FIG. 7 is a diagram illustrating an input signal according to a second embodiment.

FIG. 7 is a diagram illustrating an input signal according to a second embodiment. The figure illustrates, in order from above, a first drive signal, a second drive signal, and an input signal.

As in the first embodiment, also in the second embodiment, the first drive signal includes a sine wave pulse group Gs (first sine wave pulse group Gs1) and a discharge pulse group Gd (first discharge pulse group Gd1), and the second drive signal includes a sine wave pulse group Gs (second sine wave pulse group Gs2) and a discharge pulse group Gd (second discharge pulse group Gd2). In the second embodiment, the discharge pulse group Gd (the first discharge pulse group Gd1 and the second discharge pulse group Gd2) is provided after the sine wave pulse group Gs. A plurality of sine wave pulse groups Gs are generated repeatedly in cycles of period T. The figure illustrates the last sine wave pulse group Gs after a multitude of sine wave pulse groups Gs have been generated repeatedly in cycles of period T. The discharge pulse group Gd is generated after the last sine wave pulse group Gs (in this example, the second sine wave pulse group Gs2) among the multitude of sine wave pulse groups Gs generated repeatedly in cycles of period T.

In the figure, the last sine wave pulse group Gs is stopped at the ending timing of the fourth term. Note, however, that the timing for stopping the last sine wave pulse group Gs does not have to be the ending timing of the fourth term. For example, the timing for stopping the last sine wave pulse group Gs may be the ending timing of the second term, or may be a timing in the middle of any of the first to fourth terms.

As can be understood from the enlarged diagram of the input signal in FIG. 7, also in the second embodiment, the first pulses P1 of the first discharge pulse group Gd1 and the second pulses P2 of the second discharge pulse group Gd2 are generated alternately, and are generated at different timings from one another. Hence, the first pulse P1 and the second pulse P2 are not generated simultaneously (i.e., the first drive signal and the second drive signal do not assume the high level simultaneously). Further, as can be understood from the enlarged diagram of the input signal, a second pulse P2 is generated between one first pulse P1 and another first pulse P1. Similarly, a first pulse P1 is generated between one second pulse P2 and another second pulse P2.

In the second embodiment, the first discharge pulse group Gd1 and the second discharge pulse group Gd2 are generated after the last one of the sine wave pulse groups Gs (in this example, the second sine wave pulse group Gs2) has been generated, and the first pulses P1 of the first discharge pulse group Gd1 and the second pulses P2 of the second discharge pulse group Gd2 are generated alternately.

As illustrated in the enlarged diagram of the input signal in FIG. 7, the discharge pulse group Gd is constituted by a plurality of first pulses P1 and a plurality of second pulses P2. The discharge pulse group Gd is constituted by alternately generating the first pulses P1 and the second pulses P2. In the second embodiment, the first pulses P1 and the second pulses P2 are generated alternately after the last sine wave pulse group Gs (in this example, the second sine wave pulse group Gs2) has been generated.

The duration for generating the discharge pulse group Gd of the second embodiment is set to be longer than one-fourth the duration of period T (i.e., duration equivalent to the first term). Hence, the duration for generating the discharge pulse group Gd of the second embodiment is longer than the duration for generating the discharge pulse group Gd of the first embodiment. (The duration for generating the discharge pulse group Gd of the first embodiment is shorter than one-fourth the duration of period T (i.e., duration equivalent to the first term). In this example, the duration for generating the discharge pulse group Gd of the second embodiment is set to be longer than the period T.

Figure 8:
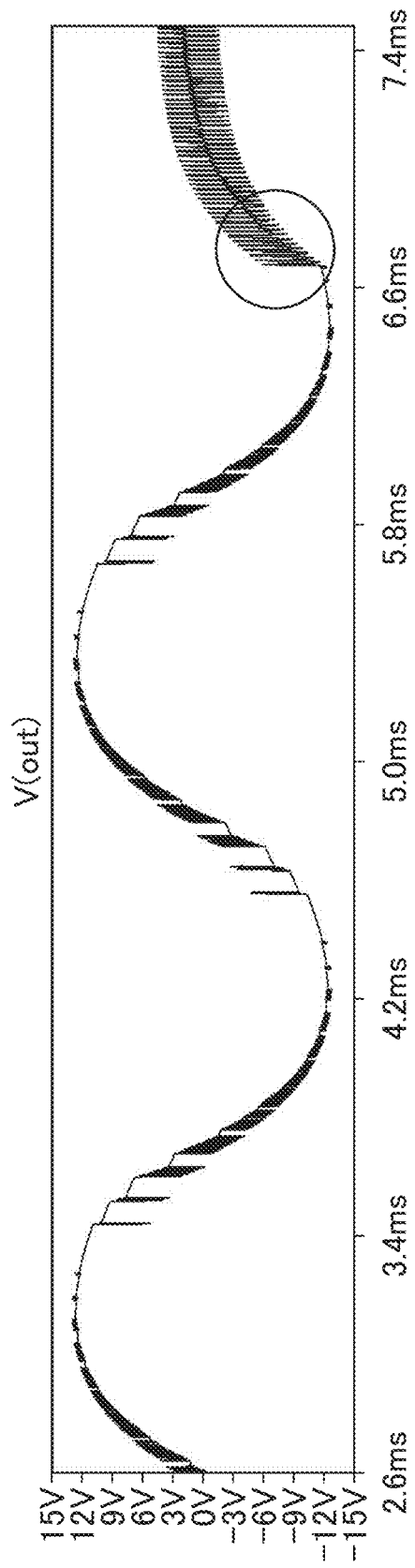
FIG. 8 is a graph of a stimulation signal of the second embodiment when a living body is connected to outputting units 31.

FIG. 8 is a graph of a stimulation signal of the second embodiment when a living body (more specifically, an equivalent circuit of a living body) is connected to the outputting units 31.

Also in the second embodiment, the stimulation signal, which is distorted by the action of the body's capacitive properties, exhibits a waveform that is analogous to a sine wave (i.e., a pseudo-sine wave). By repeatedly inputting the sine wave pulse groups Gs according to cycles of period T, a pseudo-sine wave with the period T is outputted repeatedly. In the region surrounded by the circle in the figure, inputting of the discharge pulse group Gd is started. In the region surrounded by the circle in the figure, the amount of change (decrease amount) in the stimulation signal's potential when the second pulses P2 are inputted is small, whereas the amount of change (increase amount) in the stimulation signal's potential when the first pulses P1 are inputted is large. As described above, under circumstances where the living body's capacitive component is charged, the influence imparted by either one of the first pulses P1 and the second pulses P2 becomes greater than the influence of the other. Hence, by inputting the discharge pulse group Gd in which the first pulses P1 of the first discharge pulse group Gd1 and the second pulses P2 of the second discharge pulse group Gd2 are generated alternately, it is possible to bring the stimulation signal's potential close to 0 V.

FIG. 9A illustrates an output waveform (change-over-time of the potential at Point X in FIG. 1) in a case where no discharge pulse group Gd is provided after the last sine wave pulse group Gs. Residual vibration occurs after the inputting of the last sine wave pulse group Gs is stopped and the outputting of the pseudo-sine wave is stopped. This residual vibration is a damped vibration phenomenon caused by resonance between the output-side inductive reactance and the living body's capacitive reactance. It should be noted that the frequency and duration of the residual vibration varies depending on the components constituting the output transformer and the living body's capacitance and resistance.

FIG. 9B illustrates an output waveform in a case where a discharge pulse group Gd is provided after the last sine wave pulse group Gs. By inputting the discharge pulse group Gd after the last sine wave pulse group Gs, it is possible to bring the stimulation signal's potential close to 0 V and thus suppress residual vibration. It should be noted that, in the case where no discharge pulse group Gd is provided (see FIG. 9A), it takes about 40 ms or longer for the residual vibration to be sufficiently damped, whereas in the case where a discharge pulse group Gd of about 4.5 ms is provided (see FIG. 9B), the time required for the residual vibration to be sufficiently damped can be shortened to about 5 ms.

It should be noted that, after generating the discharge pulse group Gd as in the second embodiment, the control unit 40 may again repeatedly generate sine wave pulse groups Gs (first sine wave pulse group Gs1 and second sine wave pulse group Gs2) as first and second drive signals, to again repeatedly output a pseudo-sine wave with period T as a stimulation signal. According to the second embodiment, it is possible to bring the stimulation signal's potential close to 0 V by generating the discharge pulse group Gd, and thus, it is possible to suppress electric charges from being kept accumulated in the living body even when pseudo-sine waves are outputted repeatedly.

Figure 10:
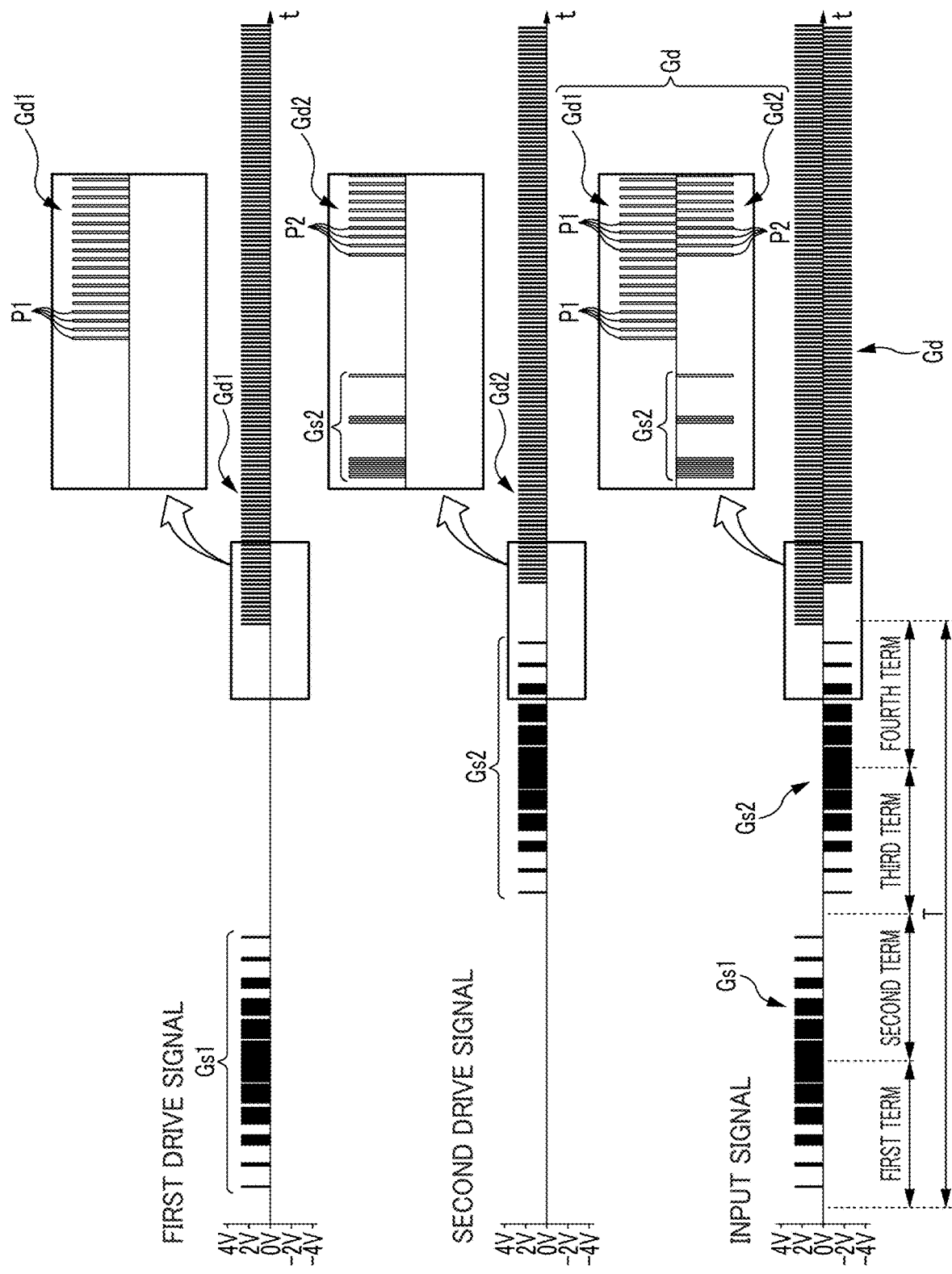
FIG. 10 is a diagram illustrating an input signal according to a modified example of the second embodiment.

FIG. 10 is a diagram illustrating an input signal according to a modified example of the second embodiment.

Also in the modified example, the first drive signal includes a sine wave pulse group Gs (first sine wave pulse group Gs1) and a discharge pulse group Gd (first discharge pulse group Gd1), and the second drive signal includes a sine wave pulse group Gs (second sine wave pulse group Gs2) and a discharge pulse group Gd (second discharge pulse group Gd2). Also in the modified example, the discharge pulse group Gd is generated after the last sine wave pulse group Gs among the multitude of sine wave pulse groups Gs generated repeatedly in cycles of period T.

In the modified example, the first discharge pulse group Gd1 of the first drive signal is constituted by a monopolar pulse group and a bipolar pulse group. The second discharge pulse group Gd2 of the second drive signal is constituted by a bipolar pulse group. In the modified example, the first discharge pulse group Gd1 of the first drive signal is generated earlier than the second discharge pulse group Gd2 of the second drive signal (i.e., the starting timing of the first discharge pulse group Gd1 is earlier than the starting timing of the second discharge pulse group Gd2). Of the plurality of first pulses P1 constituting the first discharge pulse group Gd1, the pulses that are generated before the generation of the second discharge pulse group Gd2 become monopolar pulses. Of the plurality of first pulses P1 constituting the first discharge pulse group Gd1, the pulses that are generated in a time period overlapping the generation period of the second discharge pulse group Gd2 become bipolar pulses. In the overlapping period, in which both the first discharge pulse group Gd1 and the second discharge pulse group Gd2 are generated in an overlapping manner, the first pulses P1 (bipolar pulses) of the first discharge pulse group Gd1 and the second pulses P2 (bipolar pulses) of the second discharge pulse group Gd2 are generated alternately, and are generated at different timings from one another.

As the input signal of FIG. 10 shows, the discharge pulse group Gd is constituted by a monopolar pulse group and a bipolar pulse group. The monopolar pulse group of the input signal is constituted by the monopolar pulses of the first drive signal. The bipolar pulse group of the input signal is constituted by the bipolar pulse group of the first drive signal and the bipolar pulse group of the second drive signal. In the modified example, during the generation period of the monopolar pulse group, no antipolar discharge pulse (second pulse P2 in this example) is generated. During the generation period of the bipolar pulse group, the first pulses P1 and the second pulses P2 are generated alternately.

In the modified example illustrated in FIG. 10, the last sine wave pulse group Gs is stopped at the ending timing of the fourth term. In this case, it is preferable that the first discharge pulse group Gd1 of the first drive signal is generated earlier than the second discharge pulse group Gd2 of the second drive signal. (Stated differently, it is preferable that monopolar pulses are provided in the first discharge pulse group Gd1 of the first drive signal.) In this way, it is possible to bring the stimulation signal's potential close to 0 V quickly, as will be described below. In contrast, in cases where the last sine wave pulse group Gs is stopped at the ending timing of the second term, it is preferable that the second discharge pulse group Gd2 of the second drive signal is generated earlier than the first discharge pulse group Gd1 of the first drive signal. (Stated differently, it is preferable that monopolar pulses are provided in the second discharge pulse group Gd2 of the second drive signal, and not in the first discharge pulse group Gd1 of the first drive signal.) As described above, the monopolar pulse group is provided in either one of the first discharge pulse group Gd1 of the first drive signal or the second discharge pulse group Gd2 of the second drive signal, depending on the stimulation signal's potential at the timing for stopping the last sine wave pulse group Gs (or the timing for generating the discharge pulse group Gd).

Figure 11:
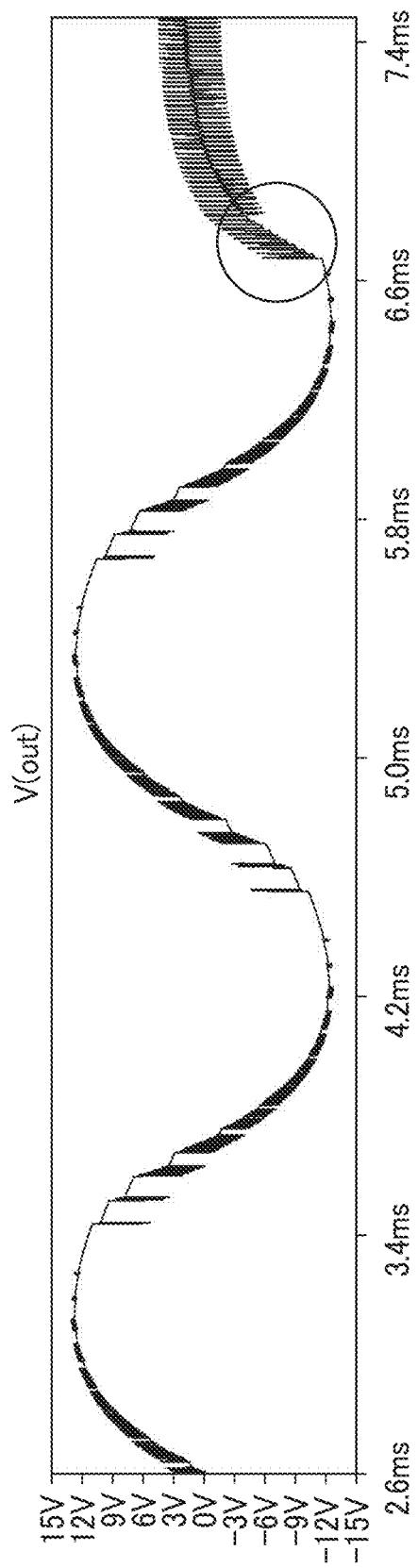
FIG. 11 is a graph of a stimulation signal of the modified example.

FIG. 11 is a graph of a stimulation signal of the modified example. In the modified example, no antipolar discharge pulse is inputted during the generation period of the monopolar pulse group, and hence, it is possible to quickly discharge electric charges accumulated in a living body, compared to cases where bipolar discharge pulses (first pulses P1 and second pulses P2) are inputted as illustrated in FIG. 8.

Incidentally, because of individual differences among capacitive properties of living bodies, it is difficult to set a monopolar pulse group so that discharging can be conducted suitably for each individual. (For example, in cases where the number of pulses in the monopolar pulse group is increased to suit an individual that is hard to discharge, if the living body stimulation device is used with respect to an individual that is easily discharged, the monopolar pulse group will conduct excessive discharging, and residual vibration may linger.) In contrast, in the aforementioned second embodiment (see FIGS. 7 and 8), the discharge pulses are configured by both the first pulses P1 and the second pulses P2 (i.e., bipolar pulses), and thus, it is possible to suppress situations where excessive discharging is conducted and to set the discharge pulses such that suitable discharging can be conducted for any individual. Note, however, that in cases where a monopolar pulse group can be set to suit an individual that is most easily discharged, the modified example will be able to both set the discharge pulses such that suitable discharging can be conducted for any individual and also quickly discharge electric charges accumulated in a living body.

Summary:

The living body stimulation device 1 of the first and second embodiments includes a transformer 10, a first switch 21, a second switch 22, a control unit 40, and outputting units 31 (see FIG. 1). The control unit is configured to generate: a first drive signal including a first sine wave pulse group Gs1 and a first discharge pulse group Gd1; and a second drive signal including a second sine wave pulse group Gs2 and a second discharge pulse group Gd2 (see FIGS. 2, 7, and 9). The control unit 40 is configured to alternately generate the first sine wave pulse group Gs1 and the second sine wave pulse group Gs2, to thereby cause the outputting units 31 to output a stimulation signal which becomes a pseudo-sine wave. Further, the control unit 40 is configured to alternately generate first pulses P1 which constitute the first discharge pulse group Gd1 and second pulses P2 which constitute the second discharge pulse group Gd2. According to the living body stimulation device 1 of the first and second embodiments, by constituting the discharge pulse group Gd by bipolar pulses (the first pulses P1 and the second pulses P2), it is possible to discharge electric charges accumulated in a living body while suppressing the influence of individual differences among living bodies compared to cases where the discharge pulse group Gd is constituted by monopolar pulses.

The control unit 40 of the first embodiment is configured to generate the first discharge pulse group Gd1 immediately before and immediately after the first sine wave pulse group Gs1 and generate the second discharge pulse group Gd2 immediately before and immediately after the second sine wave pulse group Gs2 (see FIG. 2), to thereby alternately generate the first pulses P1 of the first discharge pulse group Gd1 and the second pulses P2 of the second discharge pulse group Gd2 between a timing for generating the first sine wave pulse group Gs1 and a timing for generating the second sine wave pulse group Gs2. In this way, it is possible to discharge electric charges accumulated in a living body and thereby suppress distortions in the pseudo-sine wave, while suppressing the influence of individual differences among living bodies.

The control unit 40 of the second embodiment is configured to generate the first discharge pulse group Gd1 and the second discharge pulse group Gd2 after generating the last sine wave pulse group Gs, to thereby alternately generate the first pulses P1 of the first discharge pulse group Gd1 and the second pulses P2 of the second discharge pulse group Gd2 (see FIGS. 7 and 9). In this way, it is possible to discharge electric charges accumulated in a living body when pseudo-sine waves are outputted repeatedly, while suppressing the influence of individual differences among living bodies.

The control unit 40 of the modified example of the second embodiment is configured to generate either one of the first discharge pulse group Gd1 and the second discharge pulse group Gd2 (the first discharge pulse group Gd1 in FIG. 9) earlier than the other (the second discharge pulse group Gd2 in FIG. 9), to thereby generate either one of the first pulses P1 and the second pulses P2 (the first pulses P1 in FIG. 9) immediately before alternately generating the first pulses P1 of the first discharge pulse group Gd1 and the second pulses P2 of the second discharge pulse group Gd2. In this way, it is possible to quickly discharge electric charges accumulated in a living body.

Others:

The foregoing embodiments are for facilitating the understanding of the present invention and are not to be construed as limiting the present invention. The present invention can be modified and/or improved without departing from the gist thereof, and it goes without saying that the present invention encompasses equivalents thereof.

Transformer 10:

In the foregoing embodiments, the first switch 21 is connected to one-end side of the primary-side winding of the transformer, the second switch 22 is connected to the other-end side of the primary-side winding of the transformer 10, and a predetermined voltage V1 is applied to the center tap 13 of the transformer 10. Thus, the primary-side winding does not need to be divided, and an inexpensive transformer 10 can be used. Note, however, that the primary-side winding of the transformer 10 may be divided in two.

In the foregoing embodiments, the stimulation signal is outputted from the outputting units 31 to a living body with the configuration illustrated in FIG. 1. Note, however, that the configuration is not limited thereto, so long as a stimulation signal as described in the foregoing embodiments can be outputted from the outputting units.

REFERENCE SIGNS LIST

1: Living body stimulation device;
10: Transformer;
11: First input terminal;
12: Second input terminal;
13: Center tap;
14: First output terminal;
15: Second output terminal;
21: First switch;
22: Second switch;
31: Outputting unit (conductor element);
40: Control unit;
41: Processing device;
42: Voltage setting unit;
42A: D/A converter;
42B: Amplifier;
43: Drive signal generating unit.

The invention claimed is:

1. A living body stimulation device that outputs a stimulation signal to a living body, the living body stimulation device comprising:
a transformer;
a first switch configured to pass, through a primary-side winding of the transformer, a current in a predetermined direction;
a second switch configured to pass, through the primary-side winding of the transformer, a current in an opposite direction from the predetermined direction;
a control unit configured to generate a first drive signal including first pulses for driving the first switch and a second drive signal including second pulses for driving the second switch; and
an outputting unit connected to a secondary-side winding of the transformer and configured to output the stimulation signal, wherein
the control unit is configured to:
generate the first drive signal including:
a first sine wave pulse group constituted by some of the first pulses for turning on the first switch; and
a first discharge pulse group constituted by the others of the first pulses,
generate the second drive signal including:
a second sine wave pulse group constituted by some of the second pulses for turning on the second switch; and
a second discharge pulse group constituted by the others of the second pulses,
alternately generate the first sine wave pulse group and the second sine wave pulse group to cause the outputting unit to output the stimulation signal as a pseudo-sine wave,
generate the first discharge pulse group immediately before and immediately after the first sine wave pulse group,
generate the second discharge pulse group immediately before and immediately after the second sine wave pulse group, and
repeatedly and alternately generate one of the others of the first pulses and one of the others of the second pulses between the first sine wave pulse group and the second sine wave pulse group.

2. The living body stimulation device according to claim 1, wherein the control unit is configured to generate the first discharge pulse group and the second discharge pulse group after generating a last one of the first and second sine wave pulse groups.

3. The living body stimulation device according to claim 2, wherein the control unit is configured to generate either one of the first discharge pulse group and the second discharge pulse group earlier than the other, to generate either one of the first pulses and the second pulses immediately before repeatedly and alternately generating the one of the others of the first pulses and the one of the others of the second pulses.

* * * * *